United States Patent [19]

Fleck

[11] 4,186,059
[45] Jan. 29, 1980

[54] DEHYDRATION OF SOLVENT USED IN OIL DEWAXING-DEOILING PROCESSES

[75] Inventor: Raymond N. Fleck, West Covina, Calif.

[73] Assignee: Union Oil Company of California, Los Angeles, Calif.

[21] Appl. No.: 877,117

[22] Filed: Feb. 13, 1978

[51] Int. Cl.$^2$ .................. B01D 3/00; C01G 43/08
[52] U.S. Cl. ........................ 203/14; 203/17; 203/45; 203/81; 208/33; 208/321; 260/593 P; 585/806
[58] Field of Search ............... 203/14, 17, 39, 43, 203/44, 45, 81; 260/674 A, 593 P; 208/33–36, 321

[56] References Cited

U.S. PATENT DOCUMENTS

| | | | |
|---|---|---|---|
| 2,428,611 | 10/1947 | Berg | 203/45 |
| 2,949,419 | 8/1960 | Benedict | 208/33 |
| 3,130,143 | 4/1964 | Salmon et al. | 208/33 |
| 3,458,431 | 7/1969 | Nixon | 208/33 |
| 4,033,855 | 7/1977 | Putz | 208/33 |
| 4,088,564 | 9/1978 | Perry et al. | 208/33 |

Primary Examiner—Wilbur L. Bascomb, Jr.
Attorney, Agent, or Firm—Gregory F. Wirzbicki; Dean Sandford

[57] ABSTRACT

A process for dehydrating an essentially one-phase wet solvent stream obtained in a solvent dewaxing-solvent deoiling process, which solvent stream contains at least 60% toluene with the balance being water and methyl ethyl ketone (hereinafter MEK), is dehydrated by (a) fractionally distilling to produce a bottom fraction of anhydrous MEK-toluene solvent and an overhead fraction containing all the water originally present in the wet solvent stream; (b) condensing and separating said overhead fraction into a toluene-containing, water-lean phase, which is used as reflux in step (a), and a toluene-free, MEK-containing, water-rich phase; (c) extracting into a hydrocarbon stream some MEK from said water-rich phase and from the condensed azeotropic mixture recycled from step (g) hereinafter; (d) recovering from step (c) a second water-rich stream, which water-rich stream contains the MEK not extracted into said hydrocarbon stream; (e) azeotropically distilling said second water-rich stream so as to obtain water as a bottom product and a vaporous, overhead fraction consisting of an azeotropic mixture of water and MEK; (f) condensing said vaporous azeotropic mixture; (g) recycling a portion of said condensed azeotropic mixture to step (e) as reflux and the remaining portion to step (c); and (h) recovering an essentially anhydrous solvent from step (a), a hydrocarbon stream containing anhydrous MEK from step (c), and a water stream from step (e).

6 Claims, 1 Drawing Figure

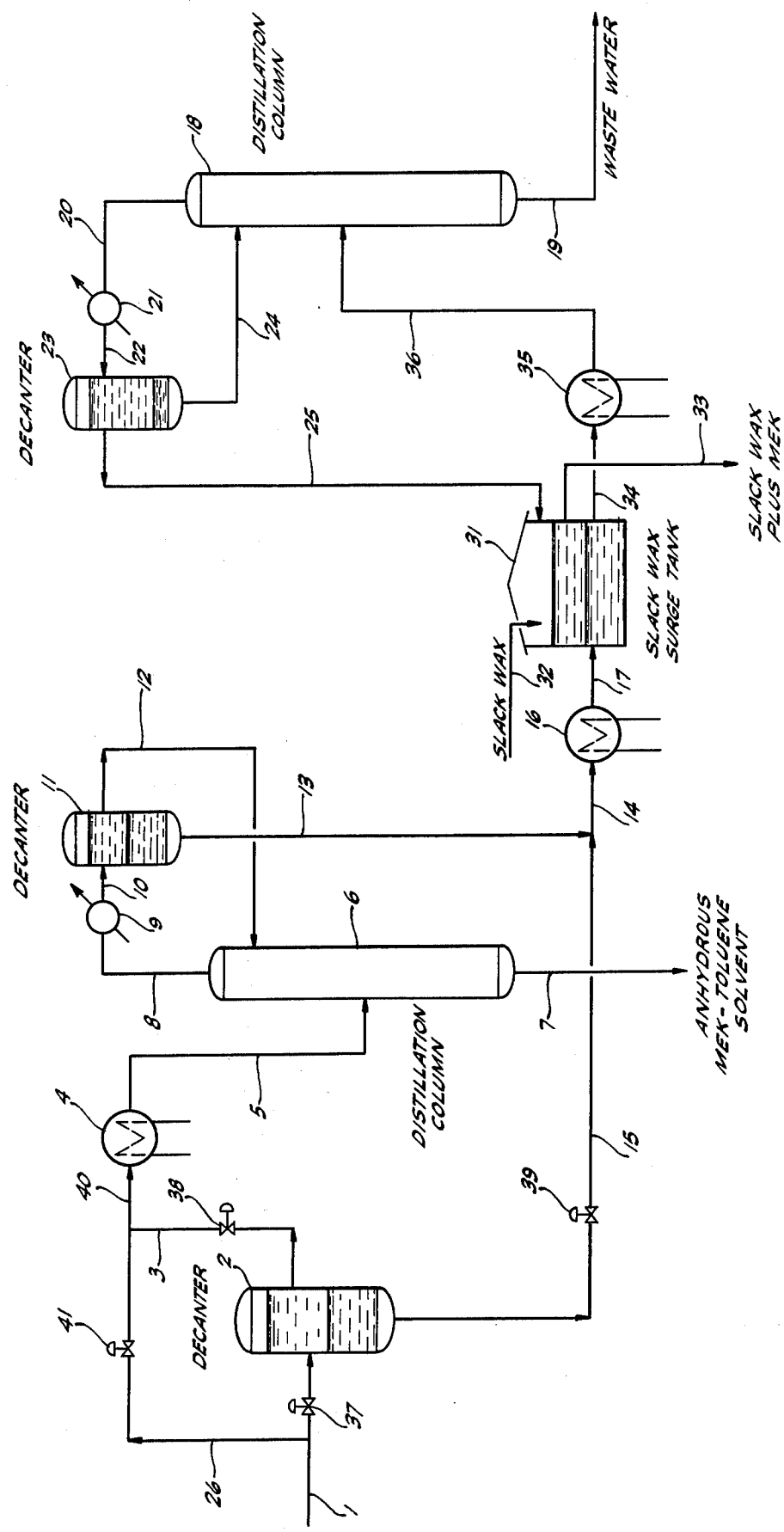

DEHYDRATION OF SOLVENT USED IN OIL DEWAXING-DEOILING PROCESSES

BACKGROUND OF THE INVENTION

This invention relates to an improvement in processes for dewaxing oils and deoiling the slack wax by-product produced from said dewaxing. More specifically, the invention relates to those solvent dewaxing-solvent deoiling processes wherein a toluene-MEK solvent used to dewax the waxy oil and deoil the slack wax by-product must be maintained in an essentially anhydrous condition.

In the art of petroleum refining, petroleum oil feedstocks are conventionally dewaxed by solvent dewaxing. In one such process, a solvent, e.g. a blend of 50% toluene and 50% MEK, is admixed with the waxy feedstock, and the resulting solvent-feedstock mixture is then passed through a series of conventional, double-piped, scraped-surface chillers. As the solvent-feedstock blend is passed through the chillers, wax gradually crystallizes therefrom, and a slurry is recovered from the final chiller that consists of solvent, oil, and crystallized slack wax. After the slack wax is separated from the slurry by filtration, a dewaxed oil-solvent filtrate remains.

In order to convert the slack wax by-product into the marketable products of foots oil (i.e., a mixture of oil and soft wax) and a fully refined petroleum wax (i.e., wax containing less than 0.5 weight percent oil), the slack wax must be deoiled, usually by the solvent deoiling process. In this process, which is similar to solvent dewaxing, the slack wax is heated above its melting temperature (usually between about 120°–180° F.) and is then combined with solvent, which usually is of the same solvent composition as that used in solvent dewaxing. The resulting blend is passed through a second series of double-piped, scraped-surface chillers, wherein cooling is effected at a rate of between about 1° and 10° F./min. During chilling, wax crystals deposit on the walls of the inner pipes of the chillers while the rotating scrapers within the chillers gently remove the deposited wax from the inner surface of the inner pipes, thereby producing a slurry containing wax crystals. This slurry gradually increases in wax crystal content as it is passed from one chiller to the next, and, ultimately, a product slurry at a temperature between about 20° and 85° F. is recovered from the last chiller. This product slurry is then filtered to produce a foots-oil solvent filtrate and a filter cake containing solvent and fully refined petroleum wax.

Solvent utilized in the solvent dewaxing-solvent deoiling process as just described is recovered from the dewaxed oil-solvent filtrate, the foots oil-solvent filtrate, and the fully refined petroleum wax-solvent filter cake. This is usually accomplished by a combination of flash evaporation and steam stripping operations, which produce a fully refined petroleum wax, dewaxed oil, foots oil, and various streams of dry solvent containing less than about 0.5% water and wet solvent containing about 1 to about 6% water. Dry solvent is normally recycled directly to facilities for storing solvent required in the solvent dewaxing-solvent deoiling operations hereinbefore described. Meanwhile, the wet solvent, or at least some streams thereof, are at least partially dehydrated before being recycled to such storage facilities.

When the solvent utilized in the solvent dewaxing-solvent deoiling chillers comprises at least 50% toluene with the balance being MEK, the wet solvent streams obtained from steam stripping operations will consist of a two-phase liquid containing proportionally more toluene than that contained in the solvent storage facilities. For example, when the solvent fed from storage to the dewaxing and deoiling chillers contains a 50-50 mixture of toluene and MEK, the wet solvent streams will often contain 70% toluene (on a water-free basis). To partially dehydrate some or all of such wet solvent streams, a decanter is used to separate the wet solvent into a water-lean phase and a water-rich but toluene-free phase. The water-lean phase is then recycled to the solvent storage facilities and therein combined with the dry solvent. The water-rich phase, on the other hand, is usually subjected to azeotropic distillation to reduce its water concentration, thereby leaving an azeotropic vaporous fraction from which a small amount of MEK may be recovered by extraction in a hydrocarbon stream, such as a stream of melted slack wax about to be deoiled. The MEK so recovered is then recycled as a portion of the solvent used in the solvent deoiling chillers.

One problem in the dewaxing-deoiling process as just described lies in combining the water-lean solvent phase removed from the decanter with the dry solvent. Because this phase usually contains about 1% water, its introduction into the dry solvent, which usually contains less than about 0.5% water, necessarily results in increased icing in the dewaxing chillers, some of which operate at temperatures as low as −40° F. More importantly, increasing the water content in the solvent used in the dewaxing-deoiling operations throws an increased load on the chillers and evaporators. It is estimated that, for every one percent increase in water content in the solvent, a three percent increase in heat load is thrown on the chillers and flash evaporators.

It is therefore an object of the invention to provide a process for dehydrating those wet solvents from which an essentially one-phase liquid containing more than about 60% toluene, with the balance being MEK and water, may be recovered in a conventional liquids separator, such as a decanter.

It is a specific object of the invention to dehydrate the water-lean phase of a wet solvent stream obtained in solvent dewaxing-solvent deoiling processes utilizing a blend of toluene and MEK, said water-lean phase being essentially one-phase and containing at least 60% toluene with the balance consisting of water and MEK.

SUMMARY OF THE INVENTION

In accordance with this invention, dehydration of an essentially one-phase liquid containing at least 60% toluene, with the balance consisting of water and MEK, is accomplished by fractionally distilling the essentially one-phase liquid in a first distillation column wherein an anhydrous solvent bottom fraction consisting essentially of MEK and toluene is separated from an overhead vaporous fraction. The overhead fraction is, after condensation, further separated into a toluene-containing, water-lean phase and a toluene-free, but water and MEK-containing, water-rich phase. The water-lean phase is used as reflux while the water-rich phase is passed to a liquid-liquid extraction step where, by contact with a hydrocarbon liquid, some of the MEK in said water-rich phase is selectively removed and discharged as a component of a hydrocarbon liquid product.

Also discharged from the liquid-liquid extraction step is a second water-rich stream containing a small proportion of MEK. This water-rich stream is treated to recover the MEK therein contained by first azeotropically distilling to produce a bottom fraction consisting of water and a vaporous overhead fraction consisting of an azeotropic mixture of MEK and water. After condensation, a portion of the azeotropic condensate, preferably that portion containing essentially water as an extremely small second phase, is refluxed to the azeotropic distillation column while the remainder is recycled to the liquid-liquid extraction step.

The bulk of the anhydrous solvent produced in the invention is recovered as the bottom fraction of the fractional distillation column while a minor portion, consisting essentially of MEK, is recovered with the hydrocarbon stream used in the extraction step. Essentially all water in the wet solvent feed, usually in excess of about 95% thereof, is ultimately discharged as the bottom fraction product of the azeotropic distillation.

As reported herein, all concentrations reflect the volume percent concentration of the particular component under consideration. Also, the terms "essentially one-phase liquid", "essentially one-phase", and "wet solvent consisting essentially of a one-phase liquid", as used herein, refer to a liquid containing, on a volume basis, at least 98% of a one-phase material.

BRIEF DESCRIPTION OF THE DRAWING

The drawing is a schematic flow sheet of the preferred embodiment of the invention for treating a two-phase wet solvent consisting of water, toluene, and MEK, which wet solvent contains a phase comprising at least 60% toluene.

DETAILED DESCRIPTION OF THE INVENTION

This invention is directed to a process for dehydrating wet solvent streams consisting of water, toluene, and MEK, said streams having been obtained from dewaxing waxy oils and deoiling the resulting slack wax by-product. The wet solvent streams most suitable for treatment by the process herein are those consisting essentially of a one-phase liquid, or which can be separated in a conventional liquid-liquid separator to produce an essentially one-phase liquid, consisting of at least 60% toluene, preferably at least 65% toluene, and most preferably at least 70% toluene, with the balance consisting of water and MEK. Such wet solvent streams are obtainable, for example, in many solvent dewaxing-solvent deoiling operations wherein a dry MEK-toluene solvent comprising at least 50% toluene is utilized and a wet solvent bottom product containing at least about 60% toluene (water-free basis) is obtained from the flash evaporators.

Referring now to the drawing, it will be shown how a typical wet solvent stream in line 1, which for exemplary purposes herein is assumed to consist of 63.14% toluene, 27.84% MEK, and 9.02% water and to be fed at a rate of 4436 bpd, is dehydrated in accordance with the invention. Because this wet solvent stream consists at room temperature of two phases, neither of which comprises at least 98% of the entire wet solvent stream, it is first directed (with valve 37 being open and valve 41 closed) to a decanter 2 or other means for separating the stream into two liquid phases. The upper phase withdrawn from decanter 2 via line 3 is essentially one-phase and contains less than about 2% of contaminant lower phase material; for purposes herein, it is assumed to consist of 68.97% toluene, 29.55% MEK, and 1.48% water. The lower phase material, being water-rich in comparison to the upper phase material, consists of 0.26% toluene, 9.31% MEK, and 90.43% water; it is withdrawn from decanter 2 at a rate of 376 bpd through line 15 and the open valve 39.

The upper, water-lean phase in decanter 2 is directed at a rate of 4060 bpd by lines 3 and 40 to preheater 4 and is therein heated to about 230° F. The heated water-lean phase is then passed via pipe 5 to fractional distillation column 6, which is preferably of the packed column variety. The fractional distillation carried out in distillation column 6 is such that, because the concentration of toluene in pipe 5 is greater than about 60%, an essentially anhydrous solvent bottom product is produced. This bottom product, having a composition of 70.00% toluene, 29.87% MEK, and 0.13% water, is directed at a rate of 4000 bpd to storage facilities (not shown) via line 7.

The vaporous overhead product produced in distillation column 6 is passed via line 8 to condenser 9 from which a two-phase liquid at a temperature of about 100° F. is removed via line 10 and introduced into a second liquids separation means, such as decanter 11. The separation in decanter 11 is such that an upper, water-lean phase consisting essentially of toluene and MEK is obtained; it is used as reflux in distillation column 6 by means of line 12. The lower, water-rich, toluene-free phase consists of 91.67% water and 8.33% MEK; it is removed from decanter 11 by line 13 at a rate of 60 bpd and then commingled in line 14 with the water and MEK-rich, but essentially toluene-free, stream obtained from decanter 2 via line 15 at a rate of 376 bpd. The water and MEK-rich stream in line 14 consists of 90.60% water, 9.17% MEK, and 0.23% toluene.

The commingled streams in line 14, after passing through preheater 16, are introduced at a temperature of about 160° F. and a rate of about 436 bpd into a liquid-liquid extractor vessel, such as a slack wax surge tank 31, via line 17. Also introduced into slack wax surge tank 31 are an MEK and water-containing stream from line 25 and a slack wax by-product of the solvent dewaxing process. The slack wax by-product is fed at a rate sufficient to extract by absorption at least 75% of the MEK introduced into the surge tank via lines 17 and 25. For the illustrative embodiment being now described, the slack wax byproduct is fed at a sufficient rate that the product stream recovered in line 33 consists of slack wax, MEK, and toluene, with the latter two components being carried in said product stream at the rate of 40 and 1.0 bpd, respectively. The product stream in line 33 is completely water-free and is suitable as a feed to the solvent deoiling unit (not shown).

All water entering the slack wax surge tank 31 via lines 17 and 25 is rejected therefrom in pipe conduit 34. Since this water reject contains a minor proportion of recoverable MEK, it is passed at a rate of 445 bpd to preheater 35 to be heated therein to about 240° F. and then fed into distillation column 18 via pipe 36.

In distillation column 18, an azeotropic distillation is carried out. The heated water reject in line 36, consisting of 89.89% water and 10.11% MEK, is thus distilled so that a waste water stream containing no toluene and no MEK is recovered at a rate of 395 bpd via line 19. Meanwhile, an overhead vaporous product of azeotropic composition (i.e., 88.7% MEK-11.3% water) is carried in line 20 to condenser 21 to be condensed at a temperature of about 100° F. The condensed azeotrope, consisting of an extremely large proportion of one phase consisting of about 10% water and about 90% MEK and an extremely minor proportion of a second phase consisting essentially of water, is directed by line 22 to decanter 23. All of the lower, water phase and a portion of the upper, MEK-water phase is drawn from decanter 23 via line 24 and used for refluxing purposes. The remaining portion of the upper phase, however, is fed at a rate of 50 bpd to the slack wax surge tank 31 by line 25.

It can now be seen that the process of the invention produces an anhydrous solvent from wet solvent. Most of the anhydrous solvent is recovered via line 7 while the remaining minor portion, to prevent solvent loss, is recovered with the slack wax to be fed to the deoiling unit. Overall dehydration of the two-phase wet solvent of line 1 in the embodiment above described is essentially complete. The anhydrous solvent of line 7 contains about 1% of the water originally carried in line 1 while the MEK plus slack wax product of line 33 is virtually water-free.

It can now also be seen that in a typical solvent dewaxing-solvent deoiling operation the invention is useful for eliminating icing as a problem in the scraped-surface chillers. The anhydrous solvent recovered in line 7 will ultimately comprise at least a portion of the solvent incrementally added between chillers in the dewaxing and deoiling operations. As a result, much less icing occurs during chilling, and, consequently, a nuisance problem normally attendant with the use of the scraped-surface chillers is eliminated. More importantly, the chillers themselves will operate more efficiently, having their load reduced by about 3% for every 1% decrease in the water content of the solvent.

Although the invention has been described in conjunction with a specific embodiment and example thereof, it is evident that many alternatives, modifications, and variations will be apparent to those skilled in the art in light of the foregoing description of the invention. For example, it is clear that the feed rates, heating and condensation temperatures, and some of the stream compositions can be changed to accommodate the particular feedstock being treated. Also, if the wet solvent stream itself is an essentially one-phase liquid, it may be passed directly to distillation column 6 via lines 1 and 26, valves 37, 38, and 39 being closed. Further, if desired, the slack wax feed in line 32 may be replaced with any hydrocarbon liquid capable of selectively extracting MEK to the exclusion of water; one such would be the waxy oil feedstock about to be dewaxed. Further still, although the invention is most usefully employed in treating wet solvent streams obtained in solvent dewaxing and solvent deoiling units, it can be used to dehydrate any liquid feedstock as defined in the claims. These, and similar alternatives, modifications, and variations of the invention as described that fall within the spirit and scope of the appended claims are embraced by said claims.

I claim:

1. A process for dehydrating an essentially one-phase liquid feed stream consisting of water, methyl ethyl ketone, and toluene, said liquid feed stream comprising at least 60% by volume toluene, which process comprises:
   (a) fractionally distilling said liquid feed stream so as to obtain an anhydrous solvent stream consisting essentially of toluene and methyl ethyl ketone and a vapor stream containing water, toluene, and methyl ethyl ketone;
   (b) condensing said vapor stream, thereby obtaining a two-phase condensate comprising a water-lean phase containing toluene and a water-rich phase containing methyl ethyl ketone but essentially no toluene;
   (c) recycling said water-lean phase to step (a) as reflux;
   (d) extracting into a hydrocarbon stream some of the methyl ethyl ketone, but essentially none of the water, contained in said water-rich phase and the portion of the condensed azeotropic mixture recycled from step (h);
   (e) recovering from step (d) a second water-rich phase containing that portion of the methyl ethyl ketone not extracted into said hydrocarbon stream;
   (f) azeotropically distilling said second water-rich phase so as to obtain liquid water and a vaporous fraction consisting of an azeotropic mixture of water and methyl ethyl ketone;
   (g) condensing said vaporous azeotropic mixture;
   (h) recycling a portion of the condensed azeotropic mixture obtained in step (g) to step (d) and the remaining portion to step (f) as reflux; and
   (i) recovering an anhydrous solvent stream consisting essentially of toluene and methyl ethyl ketone from step (a), a hydrocarbon stream containing methyl ethyl ketone but no water from step (d), and a liquid water stream from step (f).

2. A process as defined in claim 1 wherein said one-phase liquid stream comprises at least 65% toluene.

3. A process as defined in claim 1 wherein said one-phase liquid stream comprises at least 70% toluene.

4. A process for dehydrating a two-phase liquid feed stream consisting of water, methyl ethyl ketone, and toluene, said feed stream comprising a first phase comprising at least 60% by volume toluene, which process comprises:
   (a) separating said liquid feed stream into a water-lean phase and a water-rich phase, said water-lean phase being an essentially one-phase material containing at least 60% toluene, and said water-rich phase containing essentially no toluene;
   (b) fractionally distilling said water-lean phase so as to obtain an anhydrous solvent stream consisting essentially of toluene and methyl ethyl ketone and a vapor stream containing water, toluene, and methyl ethyl ketone;
   (c) condensing said vapor stream, thereby obtaining a two-phase condensate comprising a second water-lean phase and a second water-rich phase, said second water-lean phase containing toluene and said second water-rich phase containing methyl ethyl ketone but essentially no toluene;
   (d) recycling said second water-lean phase to step (b) as reflux;
   (e) extracting into a hydrocarbon stream some of the methyl ethyl ketone, but essentially none of the water, contained in said water-rich phase of step (a), said second water rich phase of step (b), and the portion of the condensed azeotropic mixture recycled from step (i);

(f) recovering from step (e) a third water-rich phase containing that portion of the methyl ethyl ketone not extracted into said hydrocarbon stream;

(g) azeotropically distilling said third water-rich phase so as to obtain liquid water and a vaporous fraction consisting of an azeotropic mixture of water and methyl ethyl ketone;

(h) condensing said vaporous azeotropic mixture;

(i) recycling a portion of the condensed azeotropic mixture obtained in step (h) to step (e) and the remaining portion to step (g) as reflux; and (j) recovering an anhydrous solvent stream consisting essentially of toluene and methyl ethyl ketone from step (b), a hydrocarbon stream containing methyl ethyl ketone but no water from step (e), and a liquid water stream from step (g).

5. A process as defined in claim 4 wherein said water-lean phase of step (a) contains at least 65% toluene.

6. A process as defined in claim 4 wherein said water-lean phase of step (a) contains at least 70% toluene.

* * * * *